(12) United States Patent
Mori et al.

(10) Patent No.: US 7,455,299 B2
(45) Date of Patent: Nov. 25, 2008

(54) ELASTIC SEALING MEMBER FOR FUEL TANK

(75) Inventors: Hiroyoshi Mori, Iwakura (JP); Yoshiki Kodaka, Kasugai (JP)

(73) Assignee: Tokai Rubber Industries, Ltd. (JP)

( * ) Notice: Subject to any disclaimer, the term of this patent is extended or adjusted under 35 U.S.C. 154(b) by 302 days.

(21) Appl. No.: 11/502,737

(22) Filed: Aug. 11, 2006

(65) Prior Publication Data
US 2007/0221674 A1 Sep. 27, 2007

(30) Foreign Application Priority Data
Mar. 27, 2006 (JP) ............... 2006-086614

(51) Int. Cl.
*F16L 17/06* (2006.01)
(52) U.S. Cl. .............. 277/608; 277/609; 277/615; 277/644; 277/648
(58) Field of Classification Search ......... 277/607–609, 277/615, 625–626, 644, 648–649
See application file for complete search history.

(56) References Cited
U.S. PATENT DOCUMENTS

| | | | | |
|---|---|---|---|---|
| 2,924,472 A | * | 2/1960 | Bush | ............... 277/605 |
| 3,702,193 A | * | 11/1972 | Fleget et al. | ............... 277/607 |
| 5,649,713 A | * | 7/1997 | Ledgerwood | ............... 277/615 |
| 7,093,820 B2 | * | 8/2006 | Anderson et al. | ............ 251/214 |
| 2005/0035558 A1 | * | 2/2005 | Dipzinski et al. | ............ 277/628 |

OTHER PUBLICATIONS

Patent Abstracts of Japan, Application No. 2003-069497; Seal Member and Seal Structure.
Patent Abstracts of Japan, Application No. 2004-293459; Fuel Tank.

* cited by examiner

*Primary Examiner*—Vishal Patel
(74) *Attorney, Agent, or Firm*—Andrus, Sceales, Starke & Sawall, LLP

(57) ABSTRACT

A sub sealing projection of an elastic sealing member for a fuel tank is entirely angled, and shaped so as to satisfy 20° ≦ $\theta_1$ (angle defined by its upper surface and a cylindrical sealing portion)≦ 35°, 50° ≦ $\theta_2$(angle defined by its lower surface and the cylindrical sealing portion)≦ 70°, 0.4≦ B (radial distance between a portion having a diameter corresponding to an inner peripheral surface of the cylindrical wall portion and a leading end of the sub sealing projection)/A (maximum projecting distance of the sub sealing projection)≦ 0.55, and a leading end portion of the sub sealing projection is shaped so as to satisfy a condition, 0.1≦ R (curvature radius of cross-section thereof)/C(length of a base portion of the sub sealing projection)≦ 0.2.

2 Claims, 11 Drawing Sheets

ELASTIC SEALING MEMBER FOR FUEL TANK

BACKGROUND OF THE INVENTION

1. Field of the Invention

The present invention relates to an elastic sealing member for a resin fuel tank for a vehicle.

2. Description of the Related Art

In a fuel tank for a vehicle, a pump unit is mounted. The pump unit has a base body in which parts and components such as a fuel pump are assembled, a fuel in the fuel tank is pumped up by the fuel pump and delivered to an engine side via an outlet piping.

In a conventional structure for mounting the pump unit to the fuel tank, the fuel tank is provided with a cylindrical wall portion upright from an outer surface of a tank body of the fuel tank. And, the pump unit is inserted into the fuel tank through an opening portion on an upper end of the cylindrical wall portion of the fuel tank such that a flange portion of the base body of the pump unit is placed on an upper end surface of the cylindrical wall portion. In this state, a screw-on cap is screwed on an externally threaded portion formed on an outer peripheral surface of the cylindrical wall portion to sandwich the flange portion of the base body by the upper end surface of the cylindrical wall portion and the screw-on cap, in an axial direction of the cylindrical wall portion, namely in a vertically direction. Thereby the pump unit is mounted to the fuel tank.

When the pump unit is mounted to the fuel tank, an air-tight seal is required between the cylindrical wall portion of the fuel tank and the pump unit, specifically the base body of the pump unit. For this purpose, an elastic sealing member is interposed between the cylindrical wall portion and the base body of the pump unit.

Conventionally, a fuel tank made of metal has been used, and a plate-like elastic sealing member 200 shaped of a ring as shown in FIG. 7 has been used as such a elastic sealing member. The elastic sealing member 200 includes upper and lower flat surfaces.

Specifically, such plate-like elastic sealing member 200 is interposed between the flange portion of the base body and the upper end surface of the cylindrical wall portion, and a screw-on cap is tightened. Under its tightening force, the elastic sealing member 200 is pressed in an axial direction by the flange portion of the base body and the upper end surface of the cylindrical wall portion, and is compressed and elastically deformed. In this manner, an air-tight seal is provided between the base body and the cylindrical wall portion.

In this case, since the metal fuel tank has high-mechanical strength, when the screw-on cap or nut is tightened with large screw torque, the fuel tank itself is not deformed, and the elastic sealing member 200 is sufficiently compressed and elastically deformed to exhibit a good sealing function.

On the contrary, recently, in view of weight saving of a tank, a resin fuel tank has been increasingly used for such a fuel tank. If above such sealing structure is adapted for this case (the resin fuel tank), when the above screw-on cap is firmly tightened, a cylindrical wall portion made of resin is deformed due to load produced by tightening the screw-on cap, and there is a fear that a stable sealing performance cannot be achieved. In order to solve this problem, an elastic sealing member 202 shown as an example in FIGS. 8 and 9 is proposed as an elastic sealing member for the resin fuel tank.

The elastic sealing member 202 shown in the FIGS. 8 and 9 is the one disclosed in Patent Document 1 below. The elastic sealing member 202 has a cylindrical sealing portion 204 and a flange sealing portion 206 of annular shape, projecting radially outwardly on an upper end of the cylindrical sealing portion 204.

Meanwhile, in FIG. 8, reference numeral 208 indicates a resin fuel tank, and reference numeral 210 indicates a tank body. The resin fuel tank 208 is provided integrally with a cylindrical wall portion 212 of cylindrical shape, upright from an outer surface (an upper surface in the figure) of the tank body 210.

The cylindrical wall portion 212 has an opening portion 214 on an upper end thereof, and further, an externally threaded portion 215 in an outer peripheral surface thereof.

Reference numeral 216 indicates a pump unit that is constructed by assembling components such as a fuel pump (not shown) in a base body 218 in unitary relation. The pump unit 216 is formed with a flange portion 220 of annular shape, projecting radially outwardly on an upper end of the base body 218, and further with a fit portion 222 fitting to an inner peripheral surface of the cylindrical wall portion 212 via the elastic sealing member 202, under the flange portion 220 in the figure.

Reference numeral 224 indicates a screw-on cap that has an internally threaded portion 226 in an inner peripheral surface thereof, and a radially inwardly directed annular flange portion 228, on an upper end thereof in the figure.

As shown enlarged in FIG. 9, the radially outwardly directed flange sealing portion 206 of the above elastic sealing member 202 is formed with main sealing protrusions 230, 231 of semicircular cross-section, protruding from flange surfaces of front (outer) and back (inner) sides. Each of the main sealing protrusions 230, 231 extends annularly in a circumferential direction and along the flange sealing portion 206.

And, an outer peripheral surface of the cylindrical sealing portion 204 is formed with sub sealing projection 232 projecting radially outwardly. The sub sealing projection 232 extends annularly in a circumferential direction along the outer peripheral surface of the cylindrical sealing portion 204.

Here, the sub sealing projection 232 is entirely angled, downwardly in the figure, namely, in an inserting direction of the pump unit 216 in the cylindrical wall portion 212.

And, the sub sealing projection 232 has a triangle cross-sectional shape including a sharp point, and the triangle cross-sectional shape has a wall thickness in a vertical direction (axial direction) in the figure that gradually decreases from its base toward its leading end.

The elastic sealing member 202 performs a sealing function as follows.

With reference to FIG. 8, for mounting the pump unit 216 in the fuel tank 208, first, the elastic sealing member 202 is attached in the cylindrical wall portion 212 of the fuel tank 208 with the screw-on cap 224 removed, and the pump unit 216 is inserted inside the fuel tank 208 through the opening portion 214 of the cylindrical wall portion 212.

And then, the screw-on cap 224 is turned on the cylindrical wall portion 212 and screwed on the externally threaded portion 215 of the cylindrical wall portion 212 until screwing torque or a deformation volume is achieved as predetermined.

When the screw-on cap 224 is completely screwed thereon, the flange sealing portion 206 is sandwiched by the flange portion 220 of the base body 218 of the pump unit 216 and an outer end surface 212A of the cylindrical wall portion 212, in a vertical direction in the figure. At that time, mainly the main sealing protrusions 230, 231 formed on the flange sealing portion 206 are compressed and elastically deformed, in a vertical direction in the figure, and thereby provides an air-tight seal between the flange portion 220 of the base body 218 and the upper end surface 212A of the cylindrical wall portion 212 along their entire circumferences.

The reason why the above elastic sealing member 202 for the resin fuel tank 208 is provided with the above cylindrical sealing portion 204 and the above sub sealing projection 232 is as follows.

The resin fuel tank 208 has less mechanical strength compared to a fuel tank made of metal, and there is a fear that when the screw-on cap 224 is firmly tightened, the cylindrical wall portion 212 is deformed.

When the cylindrical wall portion 212 is deformed, there is a fear that a sealing performance of the flange sealing portion 206 becomes insufficient.

So, the elastic sealing member 202 for the resin fuel tank 208 is provided with the cylindrical sealing portion 204, and the sub sealing projection 232 is formed so as to project from its outer peripheral surface, and further, the sub sealing projection 232 is designed to elastically contact an inner peripheral surface of the cylindrical wall portion 212 of the fuel tank 208 and thereby provide a seal supplementarily. Namely, the sub sealing projection 232 functions as a secondary seal.

And, since the resin fuel tank 208 is formed typically by blow molding, a wall-thickness of the cylindrical wall portion 212 tends to be nonuniform in a circumferential direction, and accordingly, a shape of the inner peripheral surface of the cylindrical wall portion 212 tends to be uneven along the circumferential direction.

In addition, when the cylindrical wall portion 212 is deformed by tightening the screw-on cap 224, in some cases, the inner peripheral surface of the cylindrical wall portion 212 defines a irregular shape instead of a perfect circular shape. In order to ensure a secondary seal by the sub sealing projection 232 even in this case, a projecting length or height of the sub sealing projection 232 with respect to the cylindrical sealing portion 204 is increased such that an outer diameter defined by a leading end of the sub sealing projection 232 is larger than an inner diameter of the cylindrical wall portion 212 by certain length, and thereby the sub sealing projection 232 is ensured to elastically contact the inner peripheral surface of the cylindrical wall portion 212.

And, in order that the leading end portion of the sub sealing projection 232 is surely deformed so as to follow a shape of the inner peripheral surface of the cylindrical wall portion 212, the sub sealing projection 232 has a wall thickness thin at its leading end portion and has a triangle cross-sectional shape including an acutely sharp point.

However, it is found that the sub sealing projection 232 having the triangle cross sectional shape including such acutely sharp point causes a following problem.

That is, when deformation or deformation state of the sub sealing projection 232 is observed precisely, as shown in FIG. 10, a fact is found that an outer peripheral end portion of the sub sealing projection 232, namely the leading end portion thereof is deformed in an undulate manner or wave manner.

When the leading end portion of the sub sealing projection 232 is deformed in such wave manner, a clearance is created with respect to the inner peripheral surface of the cylindrical wall portion 212 and there is a fear that a sufficient seal performance cannot be ensured.

Meanwhile, an elastic sealing member for a resin fuel tank similar to the above is also disclosed in Patent Document 2 below.

| [Patent Document 1] | JP-A, 2004-293459 |
| [Patent Document 2] | JP-A, 2004-278622 |

Under the circumstances described above, it is an object of the present invention to provide an elastic sealing member for a resin fuel tank that can ensure a secondary seal or backup performance (or backup seal performance) by a sub sealing projection in case that a cylindrical wall portion of a resin fuel tank where the elastic sealing member is attached has an inner peripheral surface that is not necessarily shaped of a perfect circle or has a shape varied in a circumferential direction.

And, it is another object of the invention to provide the elastic sealing member that can favorably prevent deformation of the cylindrical wall portion created by tightening of a screw-on cap or nut, and can perform a good sealing function by a sub sealing projection, and further by a main sealing protrusion.

SUMMARY OF THE INVENTION

According to the present invention, there is provided a new elastic sealing member for a fuel tank made of resin and adapted for a vehicle. The elastic sealing member is arranged or attached between (A) a cylindrical wall portion standing upright on an outer surface of a tank body of the fuel tank and including an opening portion on an upper end of the cylindrical wall portion, and (B) a base body of a fuel pump unit for holding a fuel pump to provide a seal therebetween. The base body for holding the fuel pump has a fit portion of cylindrical shape for fitting in or to an inner peripheral surface of the cylindrical wall portion, a closing portion on an upper end thereof for closing the opening portion of the cylindrical wall portion, and an annular flange portion projecting radially outwardly at an upper position with respect to an upper end of the cylindrical wall portion.

The elastic sealing member for the fuel tank comprises a cylindrical sealing portion interposed and arranged or attached between the base body and the cylindrical wall portion, an annular flange sealing portion projecting radially outwardly on an upper end of the cylindrical sealing portion. The flange sealing portion is sandwiched between an upper end surface of the cylindrical wall portion and the flange portion of the base body by tightening a screw-on cap (a screw-on tightening cap) on an externally threaded portion of an outer peripheral surface of the cylindrical wall portion. The flange sealing portion is formed with main circumferentially annular sealing protrusions protruding from a front surface thereof facing the flange portion of the base body and a rear surface thereof facing the upper end surface of the cylindrical wall portion, respectively. The cylindrical sealing portion is formed with a sub circumferentially annular sealing projection projecting radially outwardly from an outer peripheral surface thereof. The main sealing protrusions provide a sealing function on or of the flange sealing portion and the sub sealing projection provides a sealing function on or of the cylindrical sealing portion.

Here, the sub sealing projection is entirely angled in an inserting direction of the elastic sealing member into the cylindrical wall portion and defines a maximum outer diameter larger than an inner diameter of the cylindrical wall portion. When angles defined by upper and lower surfaces of the sub sealing projection with respect to the outer peripheral surface of the cylindrical sealing portion at a base portion thereof are indicated by $\theta_1$, $\theta_2$, respectively, a radial distance of the sub sealing projection between a portion having a diameter corresponding to the inner peripheral surface of the cylindrical wall portion and a leading end (an outer end) of the sub sealing projection is indicated by B, and a maximum projecting distance of the sub sealing projection in a radial direction with respect to the outer peripheral surface of the cylindrical sealing portion is indicated by A, $\theta_1$, $\theta_2$, A, and B satisfy following equations:

$$20° \leq \theta_1 \leq 35°$$

$$50° \leq \theta_2 \leq 70°$$

$$0.4 \leq B/A \leq 0.55$$

The sub sealing projection has an arcuate cross-section on a leading end portion thereof. When a curvature radius or a radius of the leading end portion or the arcuate cross-section of the sub sealing projection or the arcuate cross-section is indicated by R, and an axial length of the base portion of the sub sealing projection is indicated by C, a relationship between R and C satisfies the condition of $0.1 \leq R/C \leq 0.2$.

The main sealing protrusions may be shaped such that when the entire flange sealing portion including the main sealing protrusions is compressed and elastically deformed within a specified deformation volume range by tightening the screw-on cap, the flange portion of the base body of the pump unit and the upper end surface of the cylindrical wall portion of the fuel tank do not abut or contact against the front and rear surfaces of the flange sealing portion.

The reason why the sub sealing projection 232 of the conventional elastic sealing member 202 is deformed in wave manner (refer to FIG. 10 (B)) as described above seems to be due to the following. A leading end portion, namely an outer peripheral end portion of the sub sealing projection 232 that defines an outer diameter or a maximum outer diameter larger than an inner diameter of the cylindrical wall portion of the fuel tank is compressed, contracted or deformed radially inwardly by an inner peripheral surface of the cylindrical wall portion, and thereby a diameter of the outer peripheral end portion of the sub sealing projection 232 changes after the conventional elastic sealing member 202 (the sub sealing projection 232) is inserted in the cylindrical wall portion. Namely, there is a difference in the diameter or a circumferential length of the outer peripheral end portion before and after insertion of the conventional elastic sealing member 202. This difference in the diameter or the circumferential length of the outer peripheral end portion seems to be a cause of the deformation thereof in wave manner.

Namely, it is assumed that the leading end portion of the sub sealing projection 232 is deformed along a circumferential direction in wave manner and thereby the difference in the circumferential length before and after insertion of the conventional elastic sealing member 202 is absorbed.

More specifically, if the sub sealing projection 232 that is compressed radially inwardly by the inner peripheral surface of the cylindrical wall portion is elastically deformed entirely from its base portion in an angled direction of the sub sealing projection 232, namely an inserting direction of the elastic sealing member 202 in the cylindrical wall portion 212, i.e., downwardly, such wrinkles (wave patterns) are not created. However, since the sub sealing projection 232 of the conventional elastic sealing member 202 has a triangle cross-sectional shape including a thin walled and sharply pointed leading end portion (outer peripheral end portion), hardness of the sub sealing projection 232 is partly low and resistance thereof to deformation is also low. Therefore, the sub sealing projection 232 is not elastically deformed in the angled direction entirely from its base portion, but only the leading end portion is partially elastically deformed as shown in FIGS. 10 (C), (D). This is the cause of deformation of the sub sealing projection 232 in wave manner in order to absorb the difference in the circumferential length before and after insertion of the conventional elastic sealing member 202.

Here, in the present invention, it is targeted that the sub sealing projection is compressed and elastically deformed entirely from its base portion. In order to realize that, angles $\theta_1$, $\theta_2$ defined by upper and lower surfaces of the sub sealing projection with respect to the outer peripheral surface of the cylindrical sealing portion at a base portion thereof, a radial distance B of the sub sealing projection between a portion having a diameter corresponding to an inner surface of the cylindrical wall portion and a leading end of the sub sealing projection, and a maximum projecting distance A of the sub sealing projection in a radial direction with respect to the outer peripheral surface of the cylindrical sealing portion are set as above. The leading end of the sub sealing projection is formed in an arcuate cross-sectional shape curved with curvature radius R, instead of an acutely and sharply pointed triangle cross-sectional shape. And, when an axial length of the base portion of the sub sealing projection is indicated by C, a value R/C is set as above.

As already stated, according to the present invention, the leading end portion of the sub sealing projection is formed in an arcuate cross-sectional shape curved with curvature radius R, and the value R/C is set above. Thereby, it is favorably prevented that only the leading end portion of the sub sealing projection is partly elastically deformed resulting in above deformation in wave manner, and deformation in wave manner creates the clearance.

When the value R/C is greater than a maximum set value 0.2, deformation in wave manner and creation of clearance due to the deformation can be prevented, however, hardness, namely elastic deformation resistance of the leading end portion of the sub sealing projection becomes too great, and capability or easiness to insert the elastic sealing member into the cylindrical wall portion is greatly lowered, and as the case may be, it becomes difficult to insert the elastic sealing member into the cylindrical wall portion.

On the other hand, when the angle $\theta_2$ is greater than a maximum set value 70°, elastic deformability of the entire sub sealing projection becomes insufficient, and the difference in the outer circumferential length of the outer peripheral end portion before and after insertion of an elastic sealing member is not sufficiently absorbed depending on elastic deformation of the entire sub sealing projection, and further hardness, namely deformation resistance of the entire sub sealing projection is increased. Thereby it becomes difficult to insert the elastic sealing member into the cylindrical wall portion.

On the contrary, when the angle $\theta_2$ is lower than a minimum set value 50°, mechanical strength of the sub sealing projection becomes insufficient. And, a problem arises that when the elastic sealing member is taken out of a mold at molding process, the sub sealing projection is cracked or torn at its base region.

Also, when the angle $\theta_1$ is greater than a maximum set value 35°, similarly, the sub sealing projection is easily cracked or torn when the elastic sealing member is taken out of a mold at molding process. On the contrary, when the angle $\theta_1$ is lower than a minimum set value 20°, hardness of the sub sealing projection becomes larger than proper hardness, deformation resistance thereof is increased. So, capability or easiness to insert the elastic sealing member in the cylindrical wall portion is decreased, and insertion of the elastic sealing member in the cylindrical wall portion becomes difficult or impossible.

In the present invention, a value B/A is also important. When the value B/A is greater than a maximum set value 0.55, an elastic deformability of the sub sealing projection itself becomes insufficient. So, capability or easiness to insert the elastic sealing member into the cylindrical wall portion is lowered, and, as the case may be, insertion of the elastic sealing member becomes impossible.

And, when the value B/A is smaller than a minimum set value 0.4, a radially inward compression force that is exerted on the leading end portion of the sub sealing projection from or by an inner peripheral surface of the cylindrical wall portion is absorbed only by deformation of the leading end portion, resulting that the leading end portion of the sub sealing projection is deformed in wave manner as stated above, and sufficient secondary sealing performance cannot be achieved.

According to the present invention as stated above, even in case that a fuel tank is made of resin, and a cylindrical wall portion of the fuel tank has an inner peripheral surface that is not necessarily shaped of a perfect circle or has a shape varied along the inner peripheral surface, the sub sealing projection can be deformed so as to favorably follow the inner peripheral surface of the cylindrical wall portion, elastically contacts the inner peripheral surface along its entire circumference, and thereby exhibits a good sealing performance.

And, it can be prevented that only the leading end portion of the sub sealing projection is partially deformed in wave manner so as to absorb the difference in circumferential length before and after insertion of the elastic sealing member in the cylindrical wall portion. The sub sealing projection can be elastically deformed entirely from its base portion to prevent deformation in wave manner and creation of a clearance, and highly reliable and stable sealing performance is ensured.

Further, capability or easiness of insertion of the pump unit can be facilitated by elastically deforming the sub sealing projection entirely from its base portion.

By the way, if the flange portion of the base body of the pump unit and the upper end surface of the cylindrical wall portion abut or contact against sealing surfaces of the flange sealing portion of the elastic sealing member during tightening of the screw-on cap, a great compressive and elastic deformation resistance is rapidly produced by the elastic sealing member, specifically the flange sealing portion at that time. As a result, a great tightening load is exerted on the cylindrical wall portion of the fuel tank, and this becomes a cause of deformation of the cylindrical wall portion. So, a shape of the main sealing protrusion is preferably designed so as not to allow the flange portion of the base body of the pump unit and the upper end surface of the cylindrical wall portion to abut or contact against the flange surfaces of the flange sealing portion, when the entire flange sealing portion including main sealing protrusions is compressed and elastically deformed within a specified deformation volume range by tightening the screw-on cap. This can prevent occurrence of such defects beforehand.

And, here, the main sealing protrusions of the flange sealing portion are sufficiently compressed and elastically deformed, and thereby a good sealing performance is maintained.

Now, the preferred embodiments of the present invention will be described in detail with reference to the drawings.

BRIEF DESCRIPTION OF THE DRAWINGS

FIG. 4 (B) is a sectional view showing a sub sealing projection of the elastic sealing member of FIG. 1.

FIG. 5 (B) is a view showing yet another embodiment of the present invention.

FIG. 9 (B) is a sectional view showing a sub sealing projection of the elastic sealing member of FIG. 8.

FIG. 9 (C) is a sectional view showing a flange sealing portion of the elastic sealing member of FIG. 8.

FIG. 10 (B) is the view of a sub sealing projection for showing the problem of the elastic sealing member of FIG. 8.

FIG. 10 (C) is a sectional view taken along line C-C in FIG. 10 (B).

FIG. 10 (D) is a sectional view taken along line D-D in FIG. 10 (B).

DETAILED DESCRIPTION OF THE PREFERRED EMBODIMENTS

Figure 1:
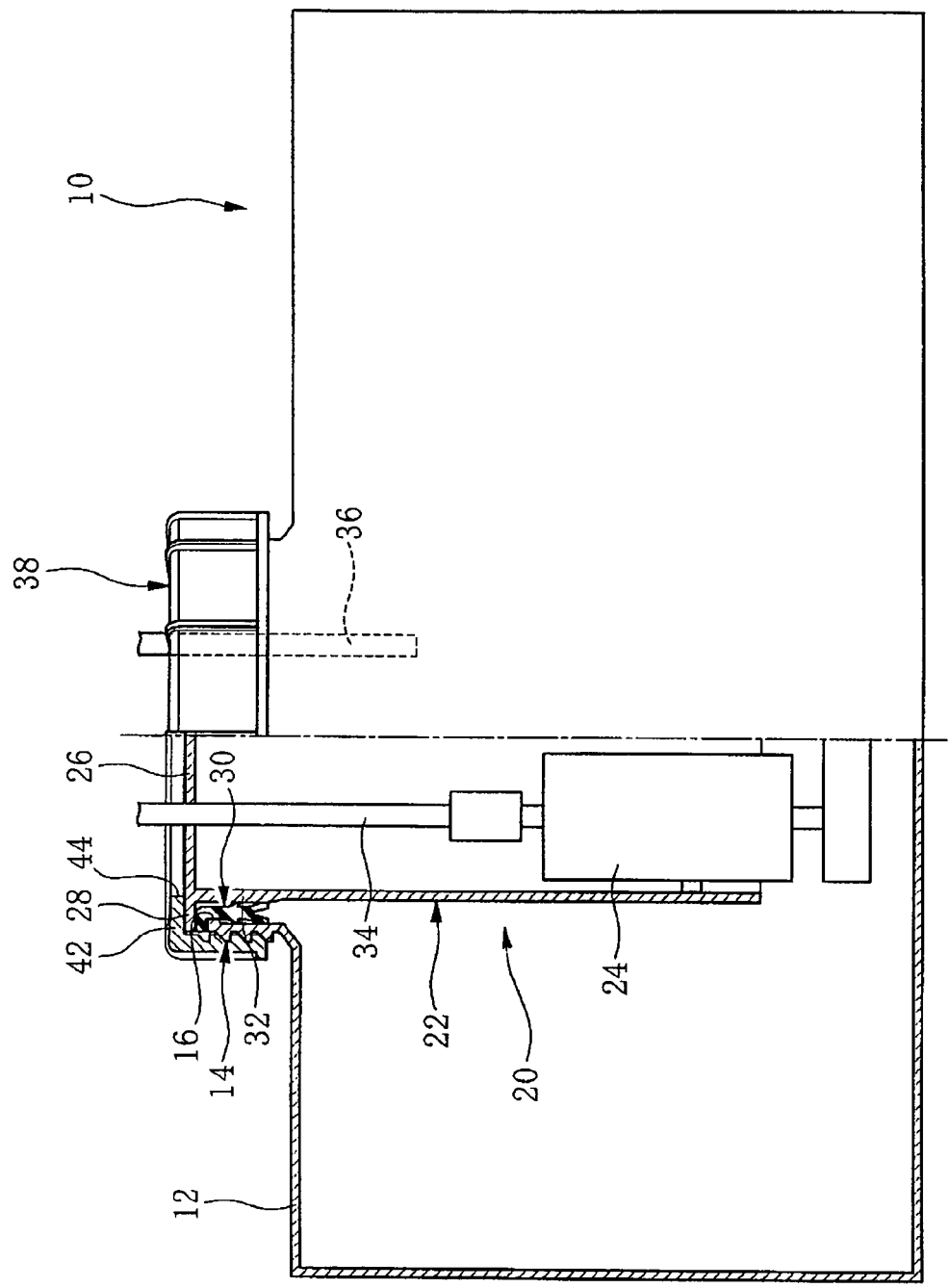
FIG. 1 is a view showing a state that an elastic sealing member according to one embodiment of the present invention is assembled or attached in a fuel tank.

In FIG. 1, reference numeral 10 indicates a resin fuel tank, and reference numeral 12 indicates a tank body.

Figure 2:
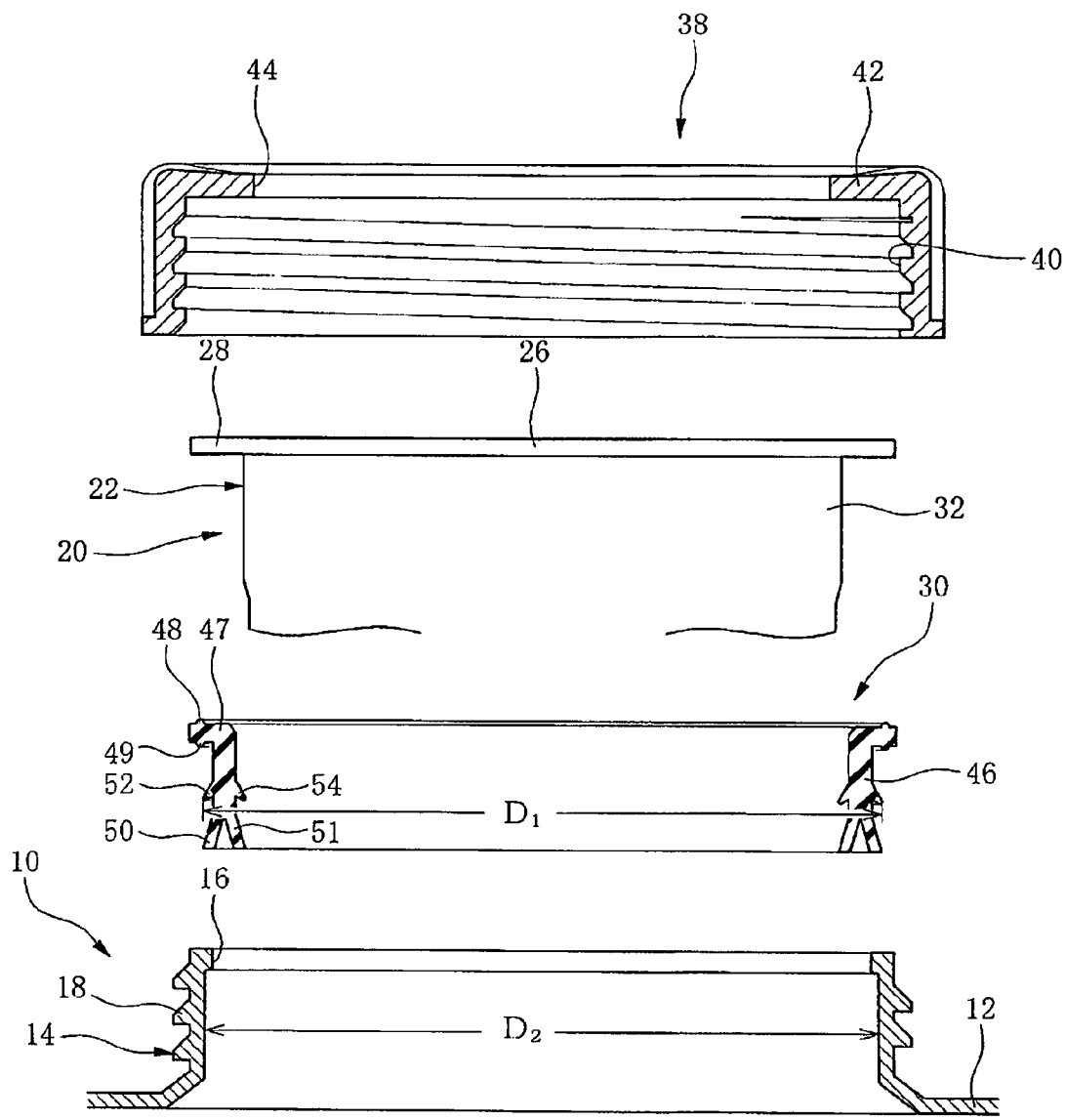
FIG. 2 is an exploded view of a relevant part of FIG. 1.
Figure 3:
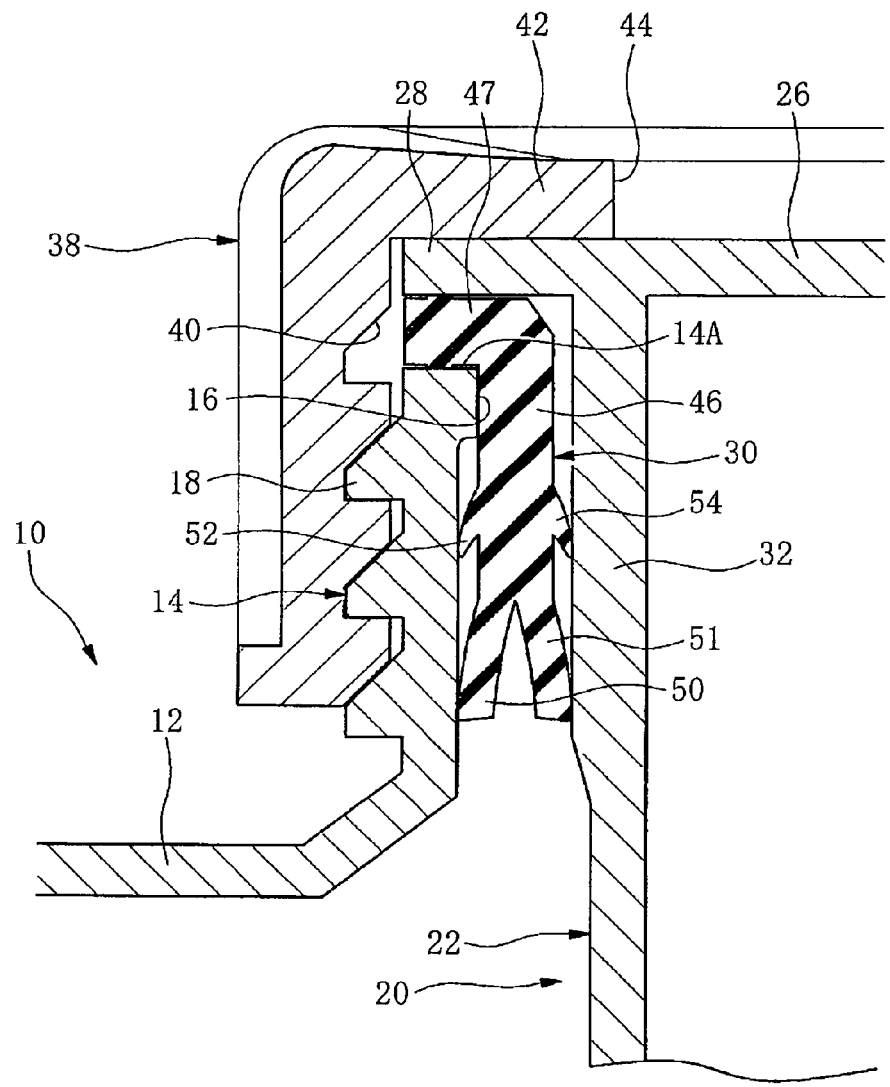
FIG. 3 is an enlarged view of a relevant part of FIG. 1.

Reference numeral 14 indicates a cylindrical wall portion of cylindrical shape, standing upright from an outer surface (upper surface in the figure) of the tank body 12, and including an opening portion 16 inside an upper end thereof or on the upper end thereof as shown also in FIGS. 2 and 3. The cylindrical wall portion 14 is further formed with an external threaded portion 18 in an outer peripheral surface thereof.

Reference numeral 20 indicates a pump unit in which parts and components such as a fuel pump 24 are assembled to a resin base body 22 and unitized. The pump unit 20 is inserted through the opening portion 16 of the cylindrical wall portion 14 into the fuel tank 10 and mounted in the fuel tank 10 with its upper end portion attached to the cylindrical wall portion 14.

The base body 22 has a plate-like closing portion 26 for closing the opening portion 16 of the cylindrical wall portion 14 on an upper end portion thereof, and an outwardly directed annular flange portion 28, projecting radially outwardly, integral with and continuous from the closing portion 26, also on upper end thereof, at an upper position with respect to the upper end of the cylindrical wall portion 14.

And, on an under side continuous from the closing portion 26 and the flange portion 28, a fit portion 32 of cylindrical shape is formed for fitting to the cylindrical wall portion 14 via an elastic sealing member 30 that will be described later.

In FIG. 1, reference numeral 34 indicates a discharge pipe for discharging a fuel pumped by the fuel pump 24 to an engine side. The discharge pipe 34 extends through and out of the closing portion 26.

In a system for returning surplus fuel from the engine side to the fuel tank 10, a return pipe 36 is also provided in and through the closing portion 26.

Reference numeral 38 indicates a screw-on cap (a tightening cap) to be screwed on and the screw-on cap 38 has an internally threaded portion 40 in an inner peripheral surface of a cylindrical peripheral wall portion thereof, as shown in FIGS. 2 and 3.

And, the screw-on cap 38 also has an inwardly directed annular flange portion 42 projecting radially inwardly on an upper end thereof. An opening portion 44 is defined inside the flange portion 42.

As shown in FIG. 3, the above pump unit 20 is mounted to the fuel tank 10, specifically to the cylindrical wall portion 14 by screwing and tightening the screw-on cap 38 on the externally threaded portion 18 of the cylindrical wall portion 14.

Specifically, the pump unit 20 is mounted to the cylindrical wall portion 14 such that the outwardly directed flange portion 28 of the base body 22 is pressed against an upper end surface 14A of the cylindrical wall portion 14 by the inwardly directed flange portion 42 of the screw-on cap 38 via the elastic sealing member 30.

The above elastic sealing member 30 is made of or formed from rubber elastic substance or material such as composite material from acrylonitrile-butadiene-rubber (NBR) and polyvinyl chloride (PVC) or fluoro rubber (FKM).

Figure 4A:
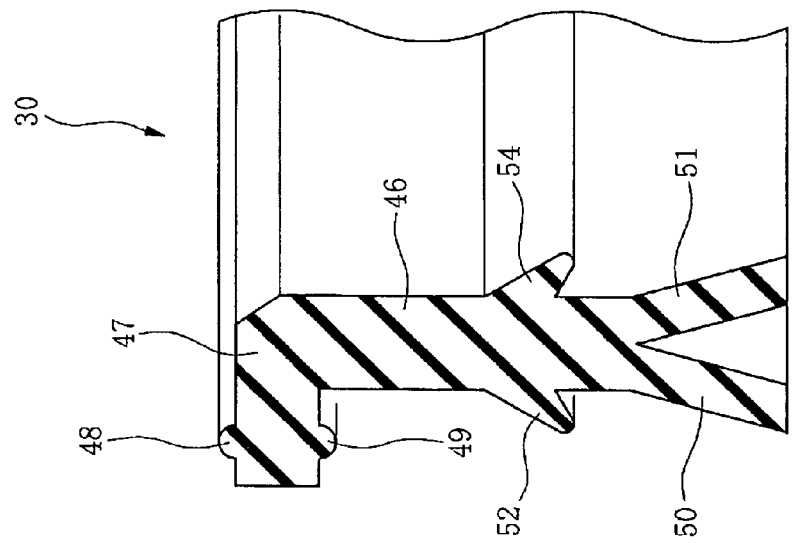
FIG. 4 (A) is a sectional view showing the elastic sealing member of FIG. 1.
Figure 4B:
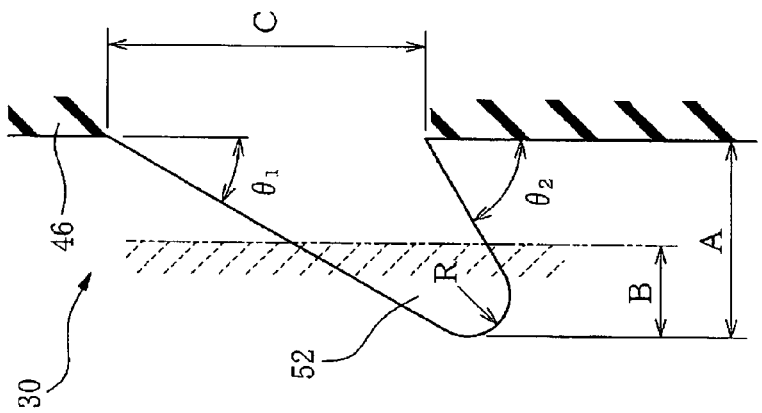

The elastic sealing member 30 includes a cylindrical sealing portion 46 of cylindrical shape and an outwardly directed annular flange sealing portion 47, projecting radially outwardly, on an upper end thereof, as shown in FIG. 4 (A).

The flange sealing portion 47 is formed with main annular sealing protrusions 48, 49 protruding from flange surfaces of the flange sealing portion 47, on front (outer) and back or rear (inner) sides thereof. That is, the sealing protrusions 48, 49 are formed on front and back flange surfaces of the flange sealing portion 47. Each of the sealing protrusions 48, 49 has a semi-circular cross-section and extends around a full circumference along the flange sealing portion 47.

Here, the main sealing protrusion 48 on the outer flange surface and the main sealing protrusion 49 on the inner flange surface are vertically symmetric.

On the other hand, a lower part of the cylindrical sealing portion 46 is bifurcated or branched into one branch portion 50 and the other branch portion 51. The one branch portion 50 is angled radially outwardly (in tapered manner), the other branch portion 51 is angled radially inwardly (in reverse tapered manner), and the one and the other branch portions 50, 51 are arranged in divergent relation.

The one and the other branch portions 50, 51 are formed so as to annularly extend around an entire circumference of the elastic sealing member 30, respectively.

The cylindrical sealing portion 46 is formed integrally with sub sealing projections 52, 54 on outer and inner peripheral surfaces on a middle region in a vertical (axial) direction in the figure (FIG. 4 (A)).

The sub sealing projection 52 is formed so as to project radially outwardly from an outer peripheral surface of the cylindrical sealing portion 46, annularly along the outer peripheral surface of the cylindrical sealing portion 46, continuously in a circumferential direction.

The inner sub sealing projection 54 is also formed so as to project radially inwardly from an inner peripheral surface of the cylindrical sealing portion 46, annularly along the cylindrical sealing portion 46, continuously in the circumferential direction.

And, the sub sealing projections 52, 54 have shapes that are entirely angled from their base portions downwardly in the figure (FIG. 4 (A)), namely angled in an inserting direction of the elastic sealing member 30 in the cylindrical wall portion 14, respectively. That is, the sub sealing projections 52, 54 are angled, entirely from their base portions toward radially outward in a downward direction, respectively.

And, each of the sub sealing projections 52, 54 has a wall thickness that gradually decreases from the base portion toward a tip end or leading end thereof.

In this embodiment, the sub sealing projection 52 has a shape determined as follows. Namely, the sub sealing projection 52 defines an outer diameter $D_1$ (maximum outer diameter) larger than an inner diameter $D_2$ of the cylindrical portion 14, as shown in FIG. 2.

And, as shown in FIG. 4 (B), the sub sealing projection 52 has an angle $\theta_1$ defined by an upper surface thereof with respect to the outer peripheral surface of the cylindrical sealing portion 46 on its base portion, and an angle $\theta_2$ defined by an lower surface thereof with respect to the outer peripheral surface of the cylindrical sealing portion 46 on it base portion. When a radial distance of the sub sealing projection 52 between a portion having a diameter corresponding the inner peripheral surface of the cylindrical wall portion 14 and the leading end of the sub sealing projection 52 is indicated by B, and a projecting distance or projecting distance in a radial direction (a maximum projecting distance or maximum projecting distance in the radial direction) of the sub sealing projection 52 with respect to the outer peripheral surface of the cylindrical sealing portion 46, namely a maximum horizontal length of the sub sealing projection 52 is indicated by A, values $\theta_1$, $\theta_2$, A, and B satisfy the following equations:

$$20° \leq \theta_1 \leq 35°$$

$$50° \leq \theta_2 \leq 70°$$

$$0.4 \leq B/A \leq 0.55$$

In this embodiment, the sub sealing projection 52 also includes the leading end portion that has an arcuate cross-section curved with a curvature radius or radius R.

And, in this embodiment, when a length of the base portion of the sub sealing projection 52 in an axial direction (vertical direction in the figure) is indicated by C, the value of the curvature radius R satisfies the following condition.

$$0.1 \leq R/C \leq 0.2$$

Meanwhile, according to this embodiment, the inner sub sealing projection 54 has the same shape or configuration as the outer sub sealing projection 52, or a symmetric shape or configuration of the outer sub sealing projection 52.

However, the inner sub sealing projection 54 may take the same shape or configuration as the conventional one.

In this embodiment, the pump unit 20 and the elastic sealing member 30 are mounted to the fuel tank 10 in the following manner (refer to FIGS. 1 and 3).

First, the elastic sealing member 30 is inserted inside the cylindrical wall portion 14 of the fuel tank 10 with the screw-on cap 38 removed, and the elastic sealing member 30 is attached in the cylindrical wall portion 14.

In this state, the flange sealing portion 47 of the elastic sealing member 30 lies on the upper end surface 14A of the cylindrical wall portion 14.

Then, the pump unit 20 is inserted inside the fuel tank 10 through the opening 16 of the cylindrical wall portion 14 (and through the inside of the elastic sealing member 30), and the flange portion 28 on the upper end of the base body 22 is placed on the upper end surface 14A of the cylindrical wall portion 14 via the flange sealing portion 47 of the elastic sealing member 30.

At that time, an outer peripheral surface of the fit portion 32 of the base body 22 fits to an inner peripheral surface of the cylindrical wall portion 14 via the elastic sealing member 30.

After that, the screw-on cap 38 is turned on the cylindrical wall portion 14 and screwed on the externally threaded portion 18 of the cylindrical wall portion 14, and fully screwed thereon.

And, when the screw-on cap 38 is completely screwed and tightened thereon, the flange sealing portion 47 of the elastic sealing member 30 including the main sealing protrusions 48, 49 are compressed and elastically deformed in a vertical direction in the figure (FIG. 3) by the flange portion 28 of the base body 22 and the upper end surface 14A of the cylindrical wall portion 14, and thereby provides an air-tight seal therebetween.

And, the pair of the branch portions 50, 51 of the cylindrical sealing portion 46 and further, the sub sealing projections 52, 54 elastically contact the inner peripheral surface of the cylindrical wall portion 14 and the outer peripheral surface of the fit portion 32 of the base body 22 to perform sealing functions, respectively.

According to the present embodiment as stated above, the elastic sealing member 30 can exhibit a good sealing performance by deforming the sub sealing projection 52 so as to favorably follow the inner peripheral surface of the cylindrical wall portion 14 and elastically contacting the sub sealing projection 52 therewith along its entire circumference even in case that the fuel tank 10 is made of resin and the cylindrical wall portion 14 has an inner peripheral surface that is not necessarily shaped of a perfect circle or has various shapes or various inner peripheral shapes along its inner peripheral surface or in a circumferential direction.

And, the sub sealing projection 52 can be elastically deformed entirely from its base portion, and thereby the sub sealing projection 52 can be favorably prevented from deformation in wave manner resulting in creation of clearance with respect to the inner peripheral surface of the cylindrical wall portion 14. Therefore, a reliable and stable sealing performance can be ensured.

EXAMPLE

Examples and comparison examples of elastic sealing members having sub sealing projections of various values of $\theta_1$, $\theta_2$, B/A and R/C are prepared. And, the examples and the comparison examples are evaluated by measuring or observing degree of deformation (appearance after assembled) of the sub sealing projections, defect thereof when elastic sealing members are molded, capability of insertion of the pump unit 20, and sealing performance.

The results are shown in Table 1 and Table 2.

TABLE 1

| | Item | \multicolumn{6}{c}{Examples} | | | | | |
|---|---|---|---|---|---|---|---|
| | | 1 | 2 | 3 | 4 | 5 | 6 |
| Dimension of sealing member | $\theta_1$ | 27° | 20° | 35° | 30° | 30° | 31° |
| | $\theta_2$ | 55° | 55° | 50° | 53° | 55° | 70° |
| | B/A | 0.4 | 0.4 | 0.5 | 0.45 | 0.5 | 0.55 |
| | R/C | 0.1 | 0.1 | 0.1 | 0.1 | 0.2 | 0.1 |
| Results | Defect when molded | No defect | No defect | No defect | No defect | No defect | No defect |
| | Insertion of pump unit | Possible | Possible | Possible | Possible | Possible | Possible |
| | Appearance after assembled | Follow an inner wall of tank | Follow an inner wall of tank | Follow an inner wall of tank | Follow an inner wall of tank | Follow an inner wall of tank | Follow an inner wall of tank |
| | Sealing performance | No leakage at 50 kPa | No leakage at 50 kPa | No leakage at 50 kPa | No leakage at 50 kPa | No leakage at 50 kPa | No leakage at 50 kPa |

TABLE 2

| | Item | \multicolumn{4}{c}{Comparison Examples} | | | |
|---|---|---|---|---|---|
| | | 1 | 2 | 3 | 4 |
| Dimension of sealing member | $\theta_1$ | 15° | 40° | 35° | 35° |
| | $\theta_2$ | 70° | 50° | 45° | 75° |
| | B/A | 0.5 | 0.5 | 0.5 | 0.5 |
| | R/C | 0.1 | 0.1 | 0.1 | 0.1 |
| Results | Defect when molded | No defect | Sealing portion cracked | Sealing portion cracked | No defect |
| | Insertion of pump unit | Impossible | — | — | Impossible |
| | Appearance after assembled | — | — | — | — |
| | Sealing performance | — | — | — | — |

| | Item | \multicolumn{4}{c}{Comparison Examples} | | | |
|---|---|---|---|---|---|
| | | 5 | 6 | 7 | 8 |
| Dimension of sealing member | $\theta_1$ | 30° | 30° | 30° | 30° |
| | $\theta_2$ | 55° | 55° | 55° | 55° |
| | B/A | 0.2 | 0.65 | 0.5 | 0.5 |
| | R/C | 0.1 | 0.1 | 0 | 0.3 |
| Results | Defect when molded | No defect | No defect | No defect | No defect |
| | Insertion of pump unit | Possible | Impossible | Possible | Impossible |

TABLE 2-continued

| | | | | |
|---|---|---|---|---|
| Appearance after assembled | — | — | Not follow inner wall of tank | — |
| Sealing performance | Leakage at 5 kPa | — | Leakage at 5 kPa | — |

Table 2 shows comparison examples where at least one of the values of $\theta_1$, $\theta_2$, B/A, R/C is out of the range of set values in the present invention.

In Table 2, comparison example No. 7 has R/C value of zero. This means that the sub sealing protrusion includes a leading end portion of conventional sharply pointed cross-section instead of an arcuate cross-section.

In Table 1 and Table 2, the examples and comparison examples are evaluated with respect to each item in the following manner.

Evaluation Method

Defect when Molded

When a product is taken out of a mold, it is checked whether a sub sealing projection is cracked, torn, etc. from a cylindrical sealing portion.

Insertion of Pump Unit

It is checked whether it is easy or possible to insert the pump unit 20 in the fuel tank 10 with an elastic sealing member attached.

Appearance after Assembled

An elastic sealing member is attached in a cylindrical wall portion, and further the pump unit 20 is inserted therein, and thereby a test specimen is prepared. The test specimen is embedded in thermosetting resin, cut vertically, and its cross-section is observed.

Sealing Performance

The test specimen is submerged in water under atmospheric room temperature, pressurized by charging Nitrogen (N2) gas up to 50 kPa, and it is checked whether leakage occurs. In order to check sealing performance of the sub sealing projection itself, main sealing protrusions are partly cut away in advance.

According to results of the comparison examples in Table 2, with regard to the comparison example No. 1 having an angle $\theta_1$ of 15° that is lower than the minimum set angle value of 20°, the pump unit 20 cannot be inserted therein (cannot be inserted by usual operator's inserting operation). With regard to the comparison example No. 2 having an angle $\theta_1$ of 40° that is greater than the maximum set angle value of 35°, the sub sealing projection is cracked when it is taken out of a mold at molding process.

With regard to the comparison example No. 3 having an angle $\theta_2$ of 45° that is lower than the minimum set angle value of 50°, the sub sealing projection is similarly cracked when it is taken out of a mold at molding process. And, with regard to the comparison example No. 4 having an angle $\theta_2$ of 75° that is greater than the maximum set angle value of 70°, the pump unit 20 cannot be favorably inserted in the fuel tank 10.

With regard to the comparison example No. 5 having a value B/A of 0.2 that is smaller than the minimum set value of 0.4, elastic deformation of the sub sealing projection provides insufficient compression force and thereby sealing property is insufficient.

And, with regard to the comparison example No. 6 having a value B/A of 0.65 that is greater than the maximum set value of 0.55, the pump unit 20 cannot be inserted in the fuel tank 10.

With regard to the comparison example No. 7 having a value R/C of zero and a leading end portion of the sub sealing projection that is not of an arcuate cross-section, the leading end portion is not deformed so as to follow an inner peripheral surface of the cylindrical wall portion 14, but is deformed in wave manner. And, a leakage is found at the sealing performance test, and sealing performance is found insufficient.

And, with regard to the comparison example No. 8 having a value R/C of 0.3 that is greater than the maximum set value of 0.2, a wall thickness or a volume of the leading end portion of the sub sealing projection is too large and as a result, the pump unit 20 cannot be favorably inserted in the fuel tank 10.

On the contrary, any of the examples No. 1 to No. 6 shown in Table 1 are good in all of properties.

Figure 5A:
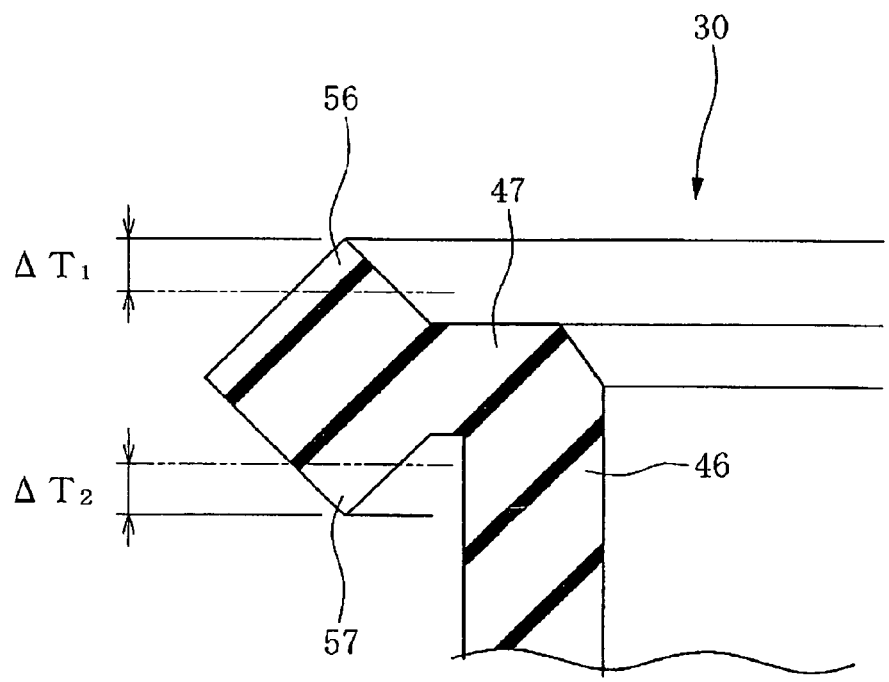
FIG. 5 (A) is a view showing another embodiment of the present invention.
Figure 5B:
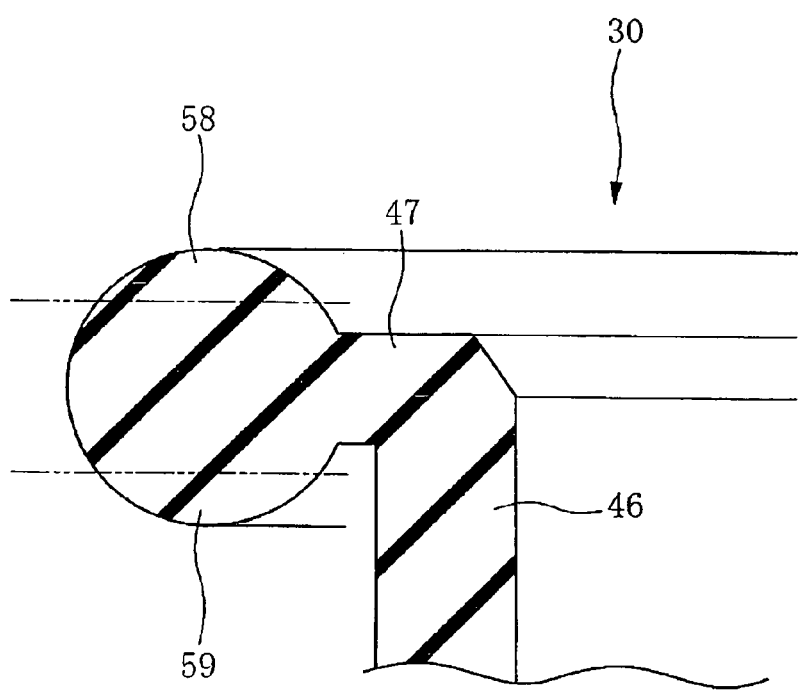

FIG. 5 shows another embodiments of the present invention.

In another embodiment, a flange sealing portion 47 functioning as a main sealing portion is formed with main sealing protrusions 56, 57 of triangle cross-sectional shape, protruding large amount from flange surfaces and simultaneously an outer peripheral end surface of the flange sealing portion 47 is formed of triangle in cross-section continuous from the main sealing protrusions 56, 57.

Here, the main sealing protrusion 56 on a front flange surface and the main sealing protrusion 57 on a rear or back flange surface are vertically symmetric.

The main sealing protrusions 56, 57 are shaped such that when the entire flange sealing portion 47 including the main sealing protrusions 56, 57 is compressed and elastically deformed within a set or specified deformation volume range (controlled tightening range) by tightening the screw-on cap 38, the flange portion 28 of the base body 22 of the pump unit 20 and the upper end surface 14A of the cylindrical wall portion 14 of the fuel tank 10 do not abut the flange surfaces of the flange sealing portion 47.

Specifically, the screw-on cap 38 is tightened until the main sealing protrusions 56, 57 are compressed and elastically deformed to positions indicated by chain double-dashed line in FIG. 5 (A), namely, a compressive and elastic deformation volume $\Delta T_1 + \Delta T_2$ reaches the specified deformation volume. Thereby it is arranged that the flange surfaces of the flange sealing portion 47 are not compressed directly, in a vertical direction in the figure, by the flange portion 28 of the base body 22 and the upper end surface 14A of the cylindrical wall portion 14.

Figure 6:
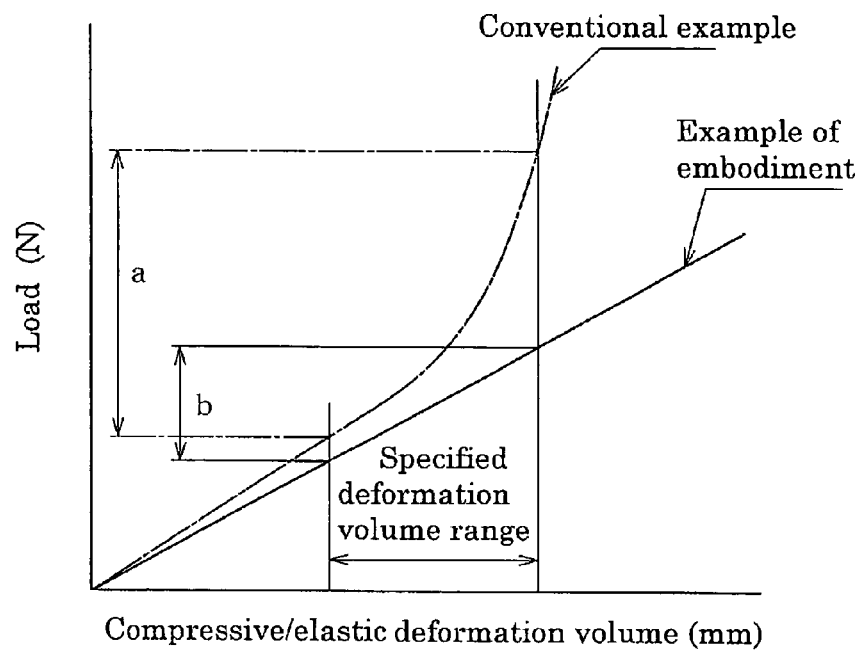
FIG. 6 is a view (graph) showing a relationship between compressive/elastic deformation volume of a main sealing protrusion and load during tightening of a screw-on cap.
Figure 7:
FIG. 7 is a view showing one example of a conventional elastic sealing member adapted for a fuel tank made of metal.
Figure 8:
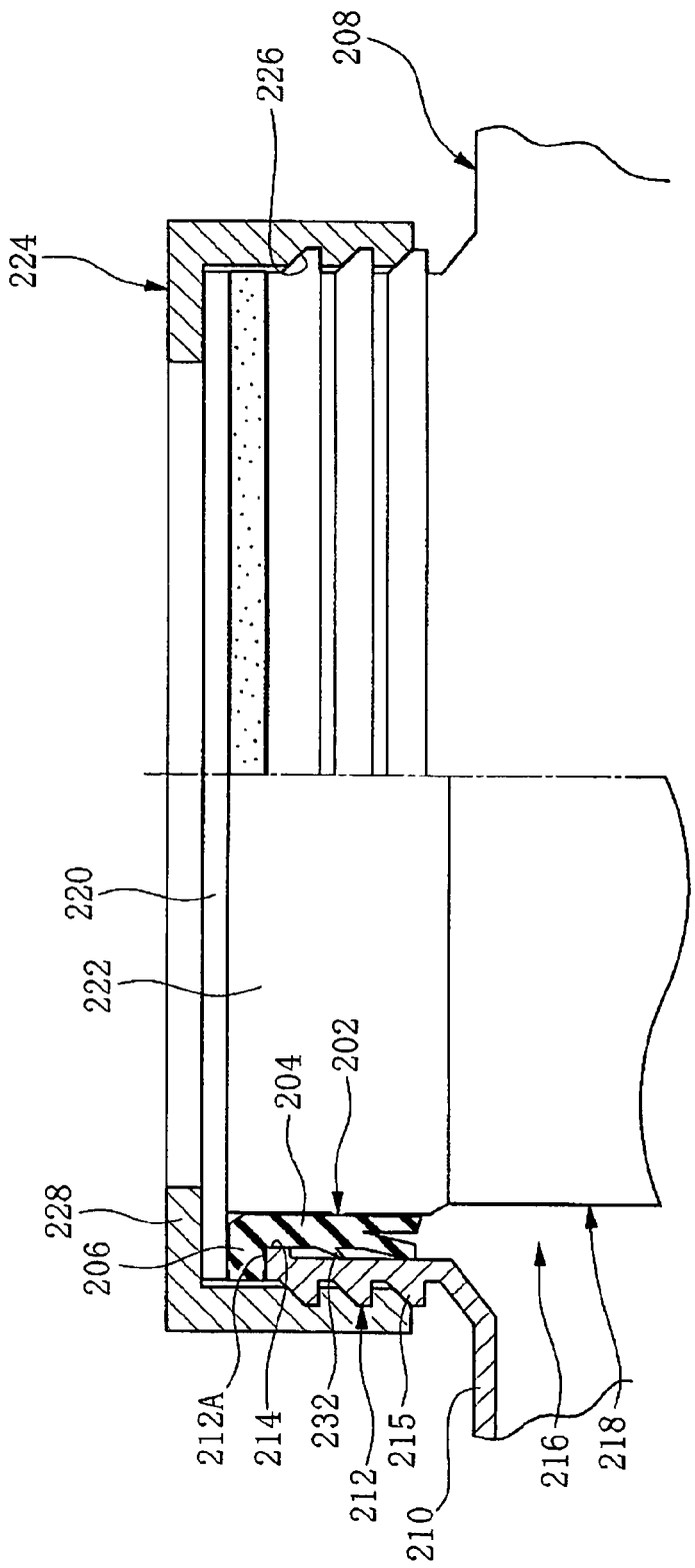
FIG. 8 is a view showing a state that a conventional elastic sealing member adapted for a fuel tank made of resin is assembled or attached in the fuel tank.
Figure 9A:
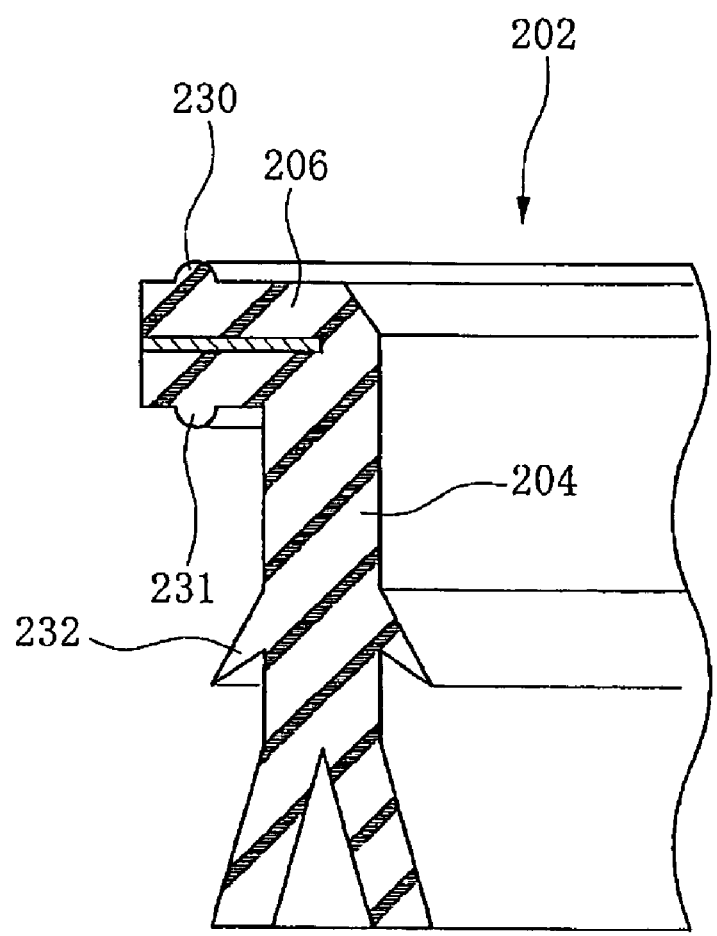
FIG. 9 (A) is a sectional view showing the elastic sealing member of FIG. 8.
Figure 9B:
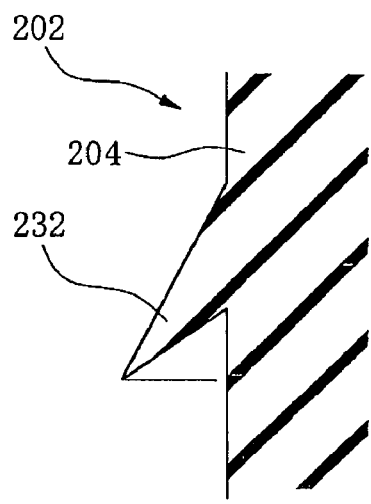
Figure 9C:
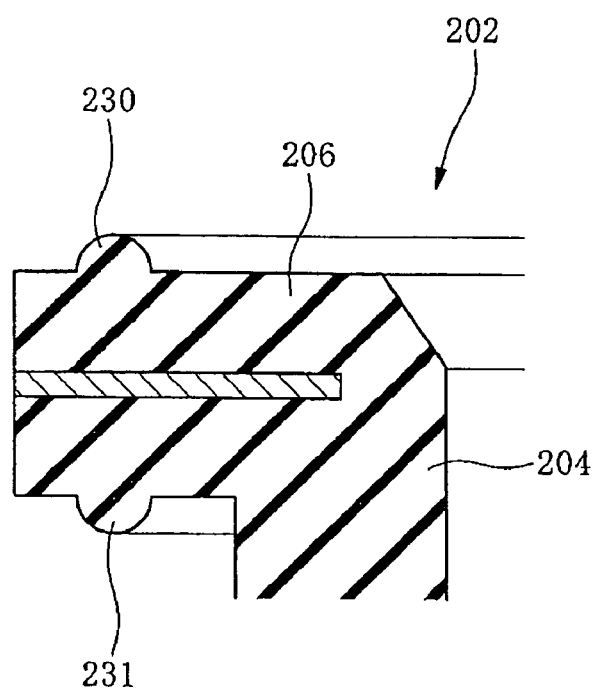
Figure 10A:
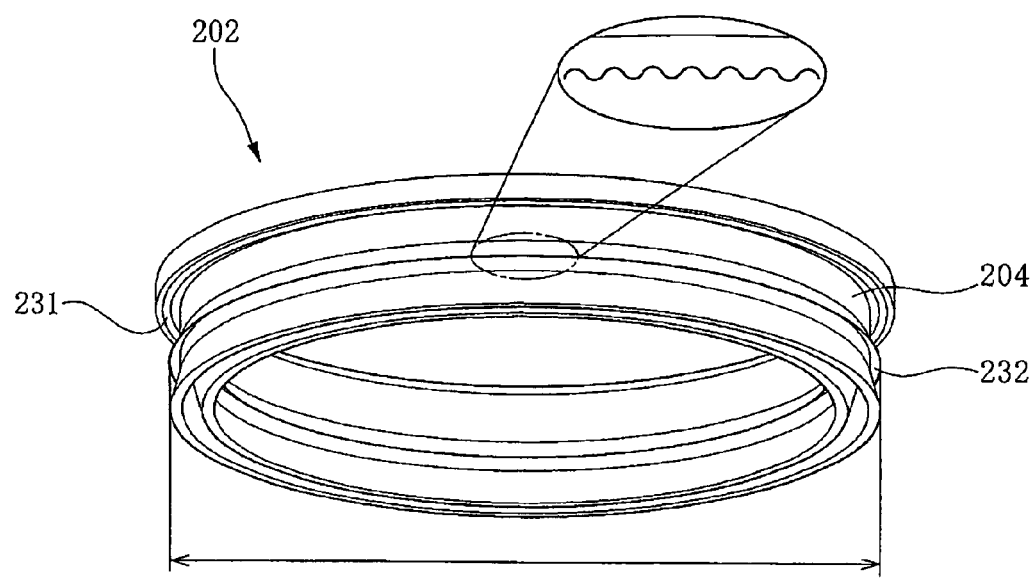
FIG. 10 (A) is an overall view of the elastic sealing member for showing a problem of the elastic sealing member of FIG. 8.
Figure 10B:
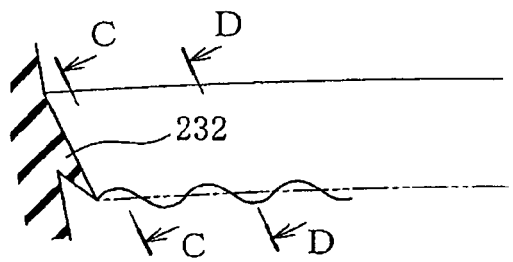
Figure 10C:
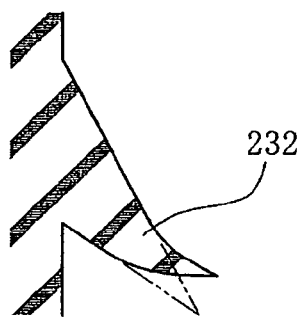
Figure 10D:
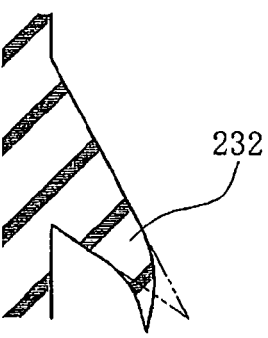

FIG. 6 shows a relationship between a compressive and elastic deformation volume and a load at that time, where a horizontal axis indicates the compressive and elastic deformation volume and a vertical axis indicates the load.

In the embodiment shown in FIG. 5 (A), when the screw-on cap 38 is tightened, the flange surfaces of the flange sealing portion 47 are not compressed directly, and only the main sealing protrusions 56, 57 are deformed. Therefore, as shown in FIG. 6, a load-flexing characteristics line does not rapidly rise in a discontinuous manner, or on reaching certain point during compression. Namely, the load rises generally in proportion to the compressive and elastic deformation volume.

The change of the load in the specified deformation volume range at that time is indicated by "b" in FIG. 6.

On the other hand, in the conventional one, when the screw-on cap 38 is tightened, since the flange portion 28 of the base body 22 and the upper end surface 14A of the cylindrical wall portion 14 abut or contact against the flange surfaces or flange sealing surfaces of the flange sealing portion 47, and further compress the flange surfaces, the load-flexing characteristics line rapidly uprises at that point of time.

Tightening amount or degree of the screw-on cap 38 is controlled in a predetermined range. However, when the load changes to "a" within the specified deformation volume range during tightening of the screw-on cap 38, there is a fear that tightening is misunderstood as completed at this point of time and thereby a sealing performance is adversely affected, or control of the tightening amount becomes confusing.

So, in the embodiment shown in FIG. 5 (A), a large load is not exerted on the cylindrical wall portion 14 during tightening of the screw-on cap 38, the cylindrical wall portion 14 can be favorably prevented from deformation, and thereby a good sealing performance is ensured on/in the flange sealing portion 47.

Meanwhile, the elastic sealing member 30 shown in FIG. 5 (A) includes main sealing protrusions 56, 57, each of which has a triangle cross-sectional shape. However, the main sealing protrusions 56, 57 may be formed in various shapes.

FIG. 5 (B) shows an example of an elastic sealing member 30 having a modified flange sealing portion 47. Here, each of main sealing protrusions 58, 59 has a cross-sectional shape of a part of a circle, and further, a leading end surface (radially outer end surface) of the flange sealing portion 47 has a cross-sectional shape also of a part of a circle, continuous from the main sealing protrusions 58, 59.

Here, the main sealing protrusion 58 on a front (outer) flange surface and the main sealing protrusion 59 on a rear (inner) flange surface are vertically symmetric.

When viewed differently, the flange sealing portion 47 of FIG. 5 (A) is regarded as having its entire leading end portion formed in a cross-sectional shape defining a major part of a rhombic shape (rhomboid) or a generally rhombic shape, and the flange sealing portion 47 of FIG. 5 (B) is regarded as having its entire leading end portion formed in a cross-sectional shape defining a major part of a circle or a generally circular shape.

Although the preferred embodiments have been described above, these are only some of embodiments of the present invention. The present invention may be constructed and embodied in various configurations and modes within the scope of the present invention.

What is claimed is:

1. An elastic sealing member for a fuel tank made of resin and adapted for a vehicle, the elastic sealing member being arranged between a cylindrical wall portion standing upright on an outer surface of a tank body of the fuel tank and including an opening portion on an upper end of the cylindrical wall portion, and a base body of a fuel pump unit for holding a fuel pump to provide a seal therebetween, the base body having a fit portion of cylindrical shape for fitting to an inner peripheral surface of the cylindrical wall portion, a closing portion on an upper end thereof for closing the opening portion of the cylindrical wall portion, and an annular flange portion projecting radially outwardly at an upper position with respect to an upper end of the cylindrical wall portion, the elastic sealing member for the fuel tank, comprising:

a cylindrical sealing portion interposed and arranged between the base body and the cylindrical wall portion, an annular flange sealing portion projecting radially outwardly on an upper end of the cylindrical sealing portion, the flange sealing portion being sandwiched between an upper end surface of the cylindrical wall portion and the flange portion of the base body by tightening a screw-on cap on an externally threaded portion of an outer peripheral surface of the cylindrical wall portion, wherein:

the flange sealing portion is formed with a main circumferentially annular sealing protrusion protruding from a front surface thereof facing the flange portion of the base body and a rear surface thereof facing the upper end surface of the cylindrical wall portion, respectively, the cylindrical sealing portion is formed with a sub circumferentially annular sealing projection projecting radially outwardly from an outer peripheral surface thereof, the main sealing protrusions provide a sealing function on the flange sealing portion and the sub sealing projection provides a sealing function on the cylindrical sealing portion, the sub sealing projection is entirely angled in an inserting direction of the elastic sealing member into the cylindrical wall portion and defines a maximum outer diameter larger than an inner diameter of the cylindrical wall portion, when angles defined by upper and lower surfaces of the sub sealing projection with respect to the outer peripheral surface of the cylindrical sealing portion at a base portion thereof are indicated by $\theta_1$, $\theta_2$ respectively, a radial distance of the sub sealing projection between a portion having a diameter corresponding to the inner peripheral surface of the cylindrical wall portion and a leading end of the sub sealing projection is indicated by B, and a maximum projecting distance of the sub sealing projection in a radial direction with respect to the outer peripheral surface of the cylindrical sealing portion is indicated by A, $\theta_1$, $\theta_2$, A, and B satisfy following equations, $$20° \leq \theta_1 \leq 35°$$

$$50° \leq \theta_2 \leq 70°$$

$$0.4 \leq B/A \leq 0.55, \text{ and}$$

the sub sealing projection has an arcuate cross-section on a leading end portion thereof, when a curvature radius of the leading end portion of the sub sealing projection is indicated by R, and an axial length of the base portion of the sub sealing projection is indicated by C, a relationship between R and C satisfies the following condition, $$0.1 \leq R/C \leq 0.2.$$

2. The elastic sealing member as set forth in claim 1, wherein the main sealing protrusions are shaped such that when the entire flange sealing portion including the main sealing protrusions are compressed and elastically deformed within a specified deformation volume range by tightening the screw-on cap, the flange portion of the base body of the pump unit and the upper end surface of the cylindrical wall portion of the fuel tank do not abut the front and rear surfaces of the flange sealing portion.

* * * * *